US012031513B2

(12) United States Patent
Freer et al.

(10) Patent No.: US 12,031,513 B2
(45) Date of Patent: Jul. 9, 2024

(54) METHOD AND SYSTEM FOR GLOW PLUG OPERATION

(71) Applicant: PRATT & WHITNEY CANADA CORP., Longueuil (CA)

(72) Inventors: Richard Freer, Saint-Basile-le-Grand (CA); Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 84 days.

(21) Appl. No.: 17/494,993

(22) Filed: Oct. 6, 2021

(65) Prior Publication Data

US 2022/0154682 A1     May 19, 2022

Related U.S. Application Data

(63) Continuation-in-part of application No. 16/951,187, filed on Nov. 18, 2020.

(51) Int. Cl.
*F02P 19/02* (2006.01)
*F02C 7/266* (2006.01)
(Continued)

(52) U.S. Cl.
CPC .............. *F02P 19/02* (2013.01); *F02C 7/266* (2013.01); *G05D 23/2401* (2013.01);
(Continued)

(58) Field of Classification Search
CPC ......... F02P 19/021; F02P 19/025; F23Q 7/00; F16F 1/00; F02C 7/266
See application file for complete search history.

(56) References Cited

U.S. PATENT DOCUMENTS 4,402,663 A  *  9/1983  Romanelli .............. F23N 5/022
                                                          431/71
6,217,312 B1    4/2001  Levinson et al.
(Continued)

FOREIGN PATENT DOCUMENTS

DE     102008002574 A1    1/2010
EP         1136697 A2     9/2001
(Continued)

OTHER PUBLICATIONS

European Patent Office, Communication re. extended European search report for European patent application No. 21208855.3, Apr. 14, 2022.
(Continued)

*Primary Examiner* — Craig Kim
(74) *Attorney, Agent, or Firm* — Norton Rose Fulbright Canada LLP

(57) ABSTRACT

A method for operating a glow plug includes controlling a temperature of the glow plug by switching between applying a voltage $V_H$ and applying a voltage $V_N<V_H$ to the glow plug. Applying the voltage $V_H$ and applying the voltage $V_N$ causes a glow plug current to oscillate about a glow plug current threshold. The glow plug current threshold is associated with one of the voltage $V_H$ and the voltage $V_N$. The method includes monitoring the glow plug current at the one of the voltage $V_H$ and the voltage $V_N$.

18 Claims, 7 Drawing Sheets

(51) Int. Cl.
*G05D 23/24* (2006.01)
*H05B 1/02* (2006.01)
*F23Q 7/00* (2006.01)

(52) U.S. Cl.
CPC ......... *H05B 1/023* (2013.01); *F05D 2220/32* (2013.01); *F05D 2260/99* (2013.01); *F23Q 7/001* (2013.01)

(56) References Cited

U.S. PATENT DOCUMENTS

| | | | | |
|---|---|---|---|---|
| 6,635,851 | B2* | 10/2003 | Uhl | F02P 19/025 219/544 |
| 7,881,851 | B2* | 2/2011 | Kernwein | F02P 19/026 123/145 A |
| 7,950,378 | B2* | 5/2011 | Casasso | F02P 19/025 123/145 A |
| 8,022,336 | B2 | 9/2011 | Casasso et al. | |
| 9,163,605 | B2 | 10/2015 | Sackmann et al. | |
| 9,488,153 | B2 | 11/2016 | Bleil et al. | |
| 9,816,478 | B2 | 11/2017 | Rapp et al. | |
| 2011/0221422 | A1* | 9/2011 | Gonder | G05B 13/02 324/76.11 |
| 2014/0331955 | A1* | 11/2014 | Fujishiro | F02P 19/021 123/179.6 |
| 2019/0013651 | A1* | 1/2019 | Michael | F02C 7/266 |
| 2022/0154647 | A1* | 5/2022 | Tanju | F02P 19/025 |
| 2022/0154682 | A1* | 5/2022 | Freer | G05D 23/2401 |

FOREIGN PATENT DOCUMENTS

| | | | |
|---|---|---|---|
| EP | 2653714 A1 | 10/2013 | |
| EP | 2728257 A2 * | 5/2014 | ............ F02P 19/027 |
| EP | 2800451 A1 | 11/2014 | |
| EP | 2572099 B1 | 3/2018 | |
| JP | S5762966 A | 4/1982 | |
| JP | S57159963 A | 10/1982 | |
| JP | S59103970 A | 6/1984 | |

OTHER PUBLICATIONS

European Patent Office, Communication re. extended European search report for European patent application No. 22200143, Feb. 24, 2023.

* cited by examiner

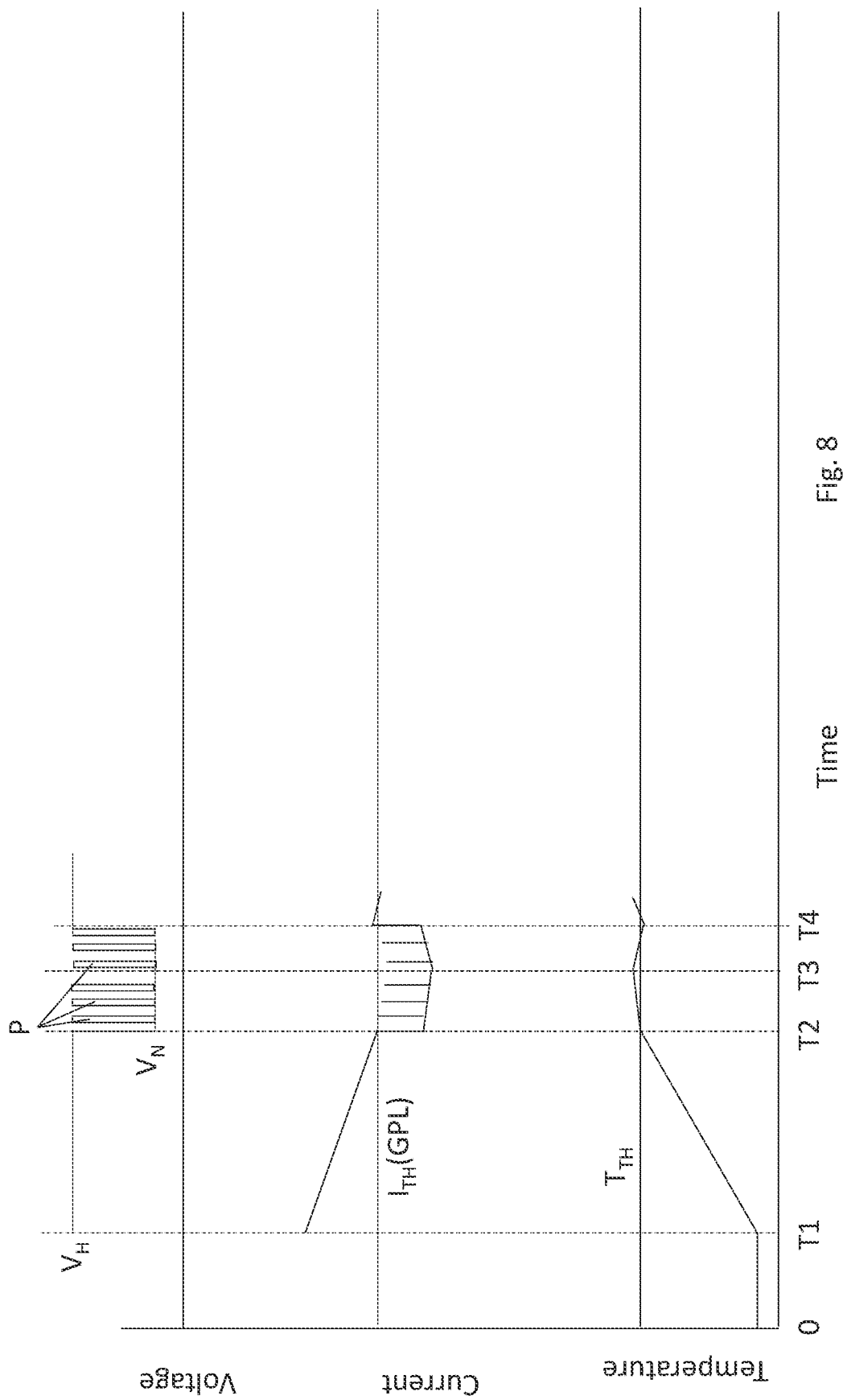

METHOD AND SYSTEM FOR GLOW PLUG OPERATION

CROSS-REFERENCE TO RELATED APPLICATIONS

This application is a continuation-in-part application of U.S. patent application Ser. No. 16/951,187 filed Nov. 18, 2020 and entitled "METHOD AND SYSTEM FOR GLOW PLUG OPERATION", the entire contents of which are incorporated by reference herein.

TECHNICAL FIELD

The application relates generally to glow plugs and, more particularly, to temperature management of a glow plug in operation.

BACKGROUND

Glow plugs are commonly used to ignite a mixture of air and fuel in a combustor of gas turbine engines. However, glow plugs have drawbacks. For instance, the glow plugs have been known to achieve less than full reliability in conditions such as when the fuel and the engine are very cold or when the environment gets too hot. Cost is also a factor. There is always room for improvement.

SUMMARY

There is disclosed a method for operating a glow plug, the method comprising: controlling a temperature of the glow plug by switching between applying a voltage $V_H$ and applying a voltage $V_N<V_H$ to the glow plug, the applying the voltage $V_H$ and the applying the voltage $V_N$ causing a glow plug current to oscillate about a glow plug current threshold, the glow plug current threshold associated with one of the voltage $V_H$ and the voltage $V_N$; and monitoring the glow plug current at the one of the voltage $V_H$ and the voltage $V_N$.

There is disclosed a glow plug system, comprising: a glow plug having a body, a glowing end extending from the body, and a connecting end opposite to the glowing end; at least one glow plug power source operatively connected to the connecting end of the glow plug for applying a voltage thereto; and a glow plug controller coupled to the glow plug and the at least one glow plug power source and configured for: controlling a temperature of the glow plug by switching between applying with the at least one glow plug power source a voltage $V_H$ and applying a voltage $V_N<V_H$ to the glow plug, the applying the voltage $V_H$ and the applying the voltage $V_N$ causing a glow plug current to oscillate about a glow plug current threshold, the glow plug current threshold associated with one of the voltage $V_H$ and the voltage $V_N$; and monitoring the glow plug current at the one of the voltage $V_H$ and the voltage $V_N$.

There is disclosed a glow plug system, comprising: a glow plug having a body, a glowing end extending from the body, and a connecting end opposite to the glowing end; at least one glow plug power source operatively connected to the connecting end of the glow plug for applying a voltage thereto; and a glow plug controller coupled to the glow plug and the at least one glow plug power source and configured for: controlling a temperature of the glow plug by switching between applying with the at least one glow plug power source a voltage $V_H$ and applying a voltage $V_N<V_H$ to the glow plug, the applying the voltage $V_H$ and the applying the voltage $V_N$ causing a glow plug current to oscillate about a glow plug current threshold; and monitoring the glow plug current about the glow plug current threshold.

DESCRIPTION OF THE DRAWINGS

Reference is now made to the accompanying figures in which:

FIG. 8 is a graph plotting temperature, current and voltage for an example glow plug as a function of time.

DETAILED DESCRIPTION

Figure 1:
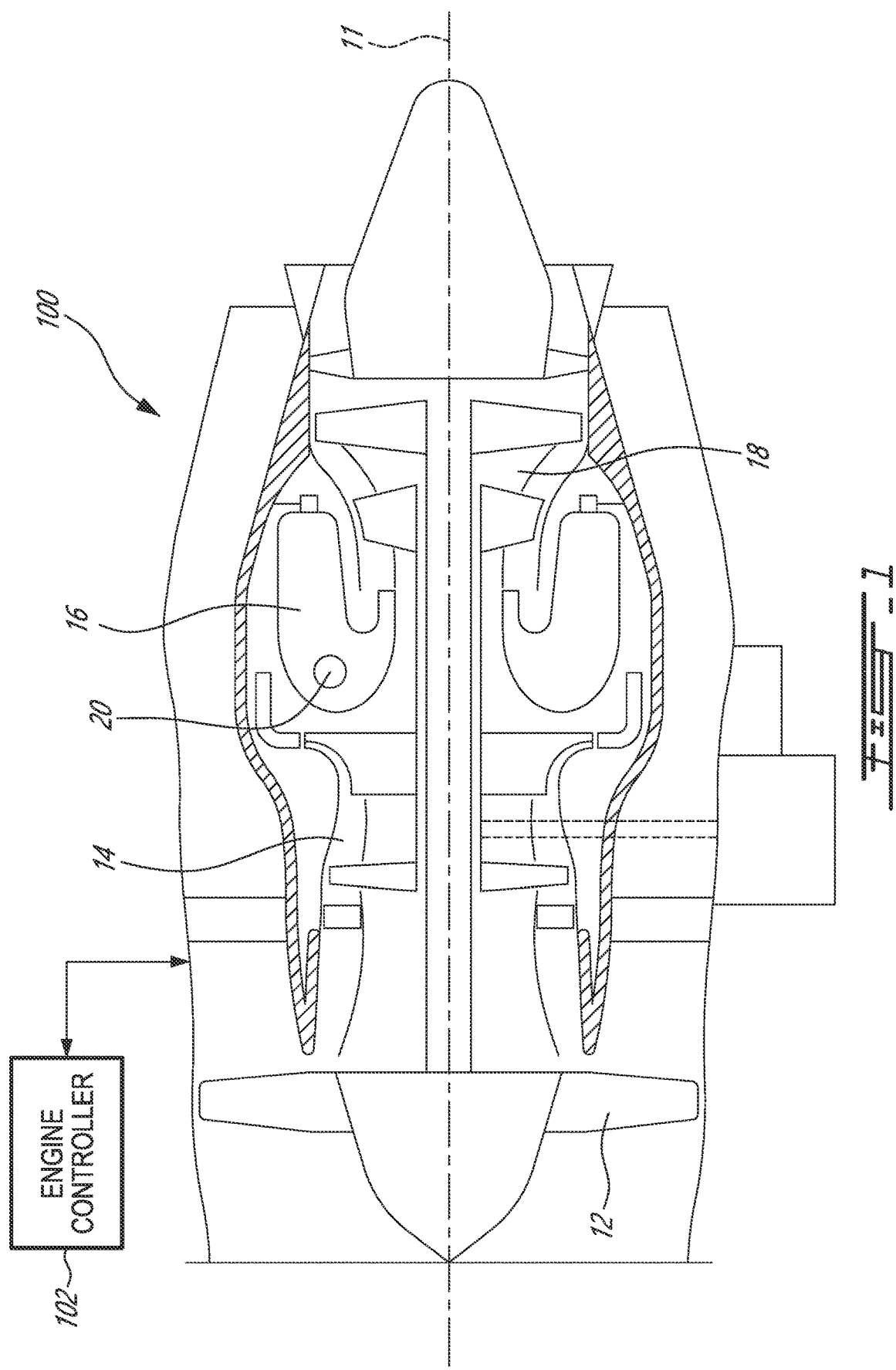
FIG. 1 is a schematic cross sectional view of a gas turbine engine.

There is described herein a glow plug system and a method for operating a glow plug. In some embodiments, the glow plug is used to ignite a combustor of an engine, such as a gas turbine engine. Alternatively, the glow plug may be used for any type of application requiring such a heating element. FIG. 1 illustrates a gas turbine engine 10 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11. The combustor 16 defines at least one aperture 20 for receiving at least one glow plug 200 (FIG. 2) for igniting the mixture of compressed air and fuel.

Control of the operation of the engine 100 can be effected by one or more control systems, for example an engine controller 102, which is communicatively coupled to the engine 100. The engine controller 102 can modulate a fuel flow provided to the engine 100, the position and orientation of variable geometry mechanisms within the engine 100, a bleed level of the engine 100, and the like, based on predetermined schedules or algorithms. In some embodiments, the engine controller 102 includes one or more a full-authority digital engine control(s) (FADEC(s)), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 102 can be coupled to the actuators, mechanical linkages, hydraulic systems, and the like, in any suitable fashion for effecting control of the engine 100.

Although illustrated as a turbofan engine, the gas turbine engine 100 may alternatively be any other type of engine for which a glow plug 200 may be used for ignition, for example a turboshaft engine or a turboprop engine. Other types of engines, such as a diesel engine or a Wankel rotary combustion engine, may also apply. The engine 100 may be for flight applications, industrial applications, or the like.

Figure 2:
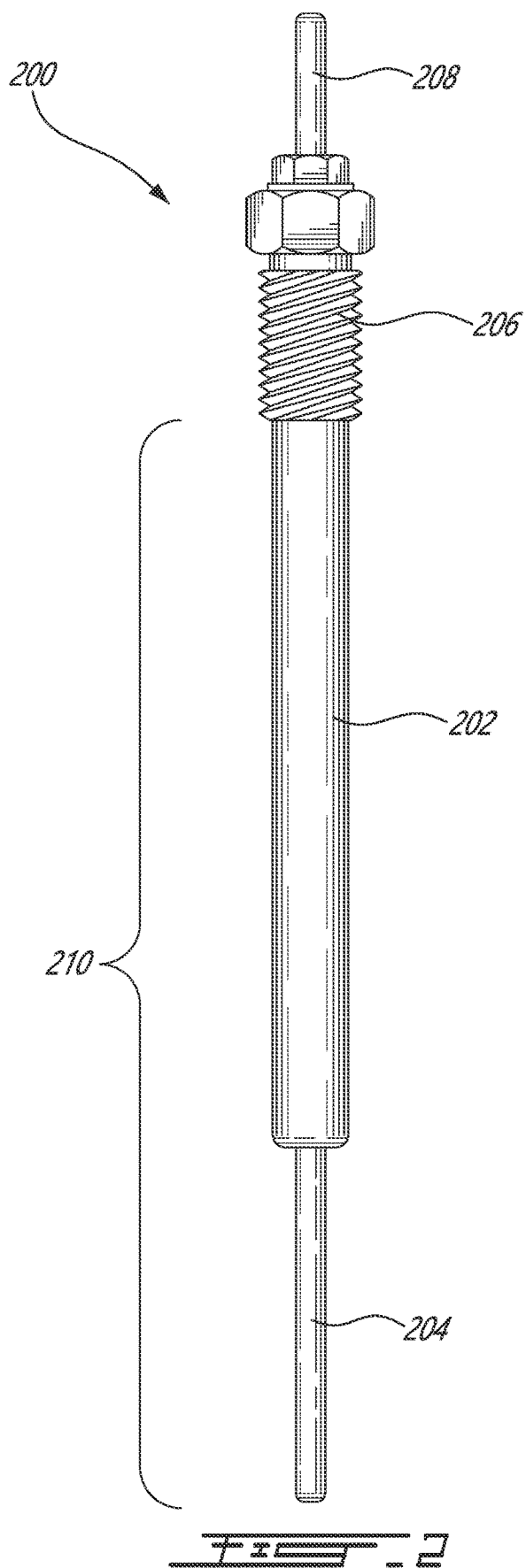
FIG. 2 is a schematic diagram of an example glow plug for the gas turbine engine of FIG. 1.

Referring to FIG. 2, the glow plug 200 has a body 202 and a glowing end 204 extending from the body 202. The glowing end 204 becomes hot during use to ignite the mixture of gas and air in the combustor 16. The glowing end 204 may be made of ceramic or metallic materials, or a combination of both. The body 202 may define a threaded portion 206 to be threadingly engaged to the aperture 20 defined through the combustor 16 of the engine 100. The glow plug 200 has a connecting end 208 opposite to the glowing end 204 for connection to a source of power.

The body 202 and glowing end 204 together form an electric heat generating member 210 having a resistance R. In some embodiments, the resistance R has a constant resistance component $R_c$ that is temperature independent, and a varying resistance component $R_v$ that is temperature dependent. The two components are connected in series such that:

$$R=R_c+R_v \quad (1)$$

The constant resistance component $R_c$ is generally very low. The varying resistance component $R_v$ varies with a resistor temperature coefficient $\alpha$ and a temperature T of the glow plug, such that equation (1) becomes:

$$R=R_c+\alpha T \quad (2)$$

The resistor temperature coefficient $\alpha$ is constant from one glow plug to another having been made with a same manufacturing process and materials, and differs from one glow plug to another having been made from different manufacturing processes and/or different materials. The constant resistance component $R_c$ may vary between acceptable limits from one glow plug to another having been made with a same manufacturing process and materials.

Figure 3A:
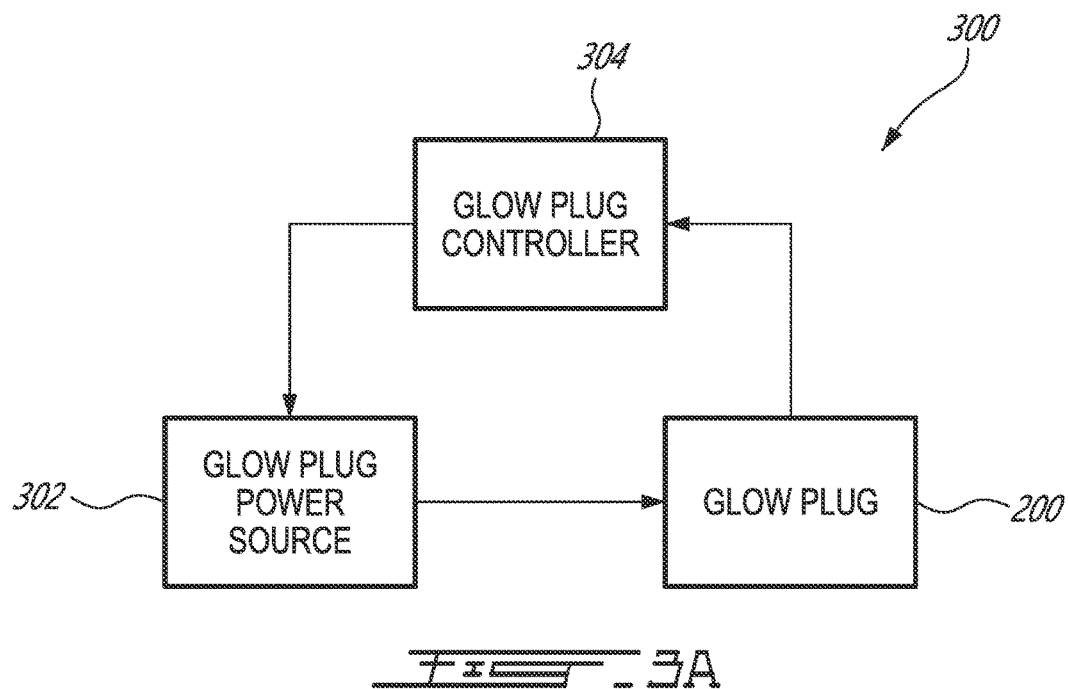
FIGS. 3A and 3B are block diagrams of examples of glow plug systems.

Referring to FIG. 3A, there is illustrated an example embodiment of a glow plug system 300. The glow plug 200 is powered by a glow plug power source 302, which may be a power supply, a battery, or any other device capable of providing at least two voltage levels to the glow plug 200. A glow plug controller 304 is coupled to the glow plug power source 302 and applies a glow plug temperature T control strategy that uses a glow plug current I(GPL) flowing into the glow plug 200 as a temperature detection mechanism and adapts a glow plug voltage V(GPL) applied to the glow plug 200 by the glow plug power source 302 accordingly.

The glow plug temperature T may be set to be within a range of temperatures that prevents the glow plug 200 from overheating, and which prevents the glow pug 200 from becoming too cold such that combustion of the mixture of gas and air in the combustor 16 is stopped. This range of temperatures for the glow plug T may have a minimum threshold temperature T1 (e.g. 1100° C.) and a maximum threshold temperature T2 (e.g. 1200° C.) which is greater than the minimum threshold temperature T1. In some embodiments, the maximum temperature T2 is less than 1400° C. and the minimum temperature T1 is greater than 1000° C. In some embodiments, the maximum temperature T2 corresponds to a temperature that permits a cycle life of at least 200 cycles for the glow plug 200. Upper and lower glow plug current values may be associated with the upper and lower temperature values T1, T2, for example 3.5 amps and 2.5 amps, respectively. These values are exemplary only and may differ, depending on practical implementations. In some embodiments, the lower temperature threshold T1 is set to be high enough to initiate fuel air mixture ignition in the engine 100. Since these temperature values T1, T2 may be known in advance as properties of the glow plug 200 and/or the combustor 16, it can be possible to determine the glow plug current I(GPL) flowing into the glow plug 200 at these minimum and maximum threshold temperatures T1, T2 when the glow plug voltage V(GPL) is applied to the glow plug 200, according to the equations (3) and (4) below.

$$V=I*R \quad (3)$$

where R can be replaced with equation (2) to get:

$$V=I*(R_c+\alpha T) \quad (4)$$

For example, since the constant resistance component $R_c$ and the resistor temperature coefficient $\alpha$ are constant, the total glow plug resistance R will be constant for a given glow plug temperature T. If the glow plug 200 is powered with glow plug voltage V(GPL), then the glow plug current I(GPL) at the minimum threshold temperature T1 will be:

$$I_1=V(GPL)/(R_c+\alpha T_1)$$

This allows for calculating a threshold current $I_1$ associated with the minimum threshold temperature T1, and helps to account for effects that might decrease the resistance of the glow plug 200 and thereby increase current, such as plug to plug variation and external cooling effects. Similarly, if the glow plug 200 is powered with the glow plug voltage V(GPL) at the maximum threshold temperature T2, then the glow plug current I(GPL) will be a threshold current $I_2$ associated with the maximum threshold temperature T2, and helps to account for effects that might increase the resistance and thereby decrease current, such as plug to plug variation and external heating effects. As long as the glow plug current I(GPL) is kept within $I_1$ and $I_2$, the glow plug temperature T will be within a range of temperatures that prevents the glow plug 200 from overheating and from being too cool.

In some embodiments, a single threshold current $I_{TH}$ associated with a single temperature $T_{TH}$ is used to manage the temperature of the glow plug 200. A calculation or testing may be performed to determine the glow plug current threshold $I_{TH}$(GPL) associated with the temperature $T_{TH}$ (e.g. 1150° C.) at which optimal performance of the glow plug 200 is expected, for the glow plug voltage V(GPL) applied to the glow plug 200. The temperature $T_{TH}$ may be selected as the temperature of the glow plug 200 that is high enough to reliably start the gas turbine engine 100 while respecting maximum engine temperature limits. In some embodiments, the temperature $T_{TH}$ may be between the minimum and maximum threshold temperatures T1, T2, for example at or around a middle point between T1 and T2. In some embodiments, another value may be used for $T_{TH}$.

Adapting equations (3) and (4) above, the glow plug current threshold $I_{TH}$(GPL) may be determined as follows:

$$I_{TH}(GPL)=V(GPL)/(R_c+\alpha T_{TH})$$

Generally, the glow plug controller 304 is configured to monitor the glow plug current I(GPL) and to make a control decision based on the glow plug current I(GPL). There are two possible scenarios, depending on the value of the glow plug current I(GPL). In the first possible scenario, the glow plug current I(GPL) is below the glow plug current threshold $I_{TH}$(GPL). This is an indication that the resistance of the grow plug 200 at the applied voltage V(GPL) has increased, which means that the glow plug temperature T is greater than the temperature $T_{TH}$ and thus the glow plug 200 may be overheating. The glow plug controller 304 responds in the first scenario by causing the glow plug power source 302 to apply a non-zero nominal voltage $V_N$ to the glow plug 200, in order to lower the glow plug temperature T.

In the second possible scenario, the glow plug current I(GPL) is above the glow plug current threshold $I_{TH}$(GPL). This is an indication that the resistance of the glow plug 200 at the applied voltage V(GPL) has decreased, which means that the glow plug temperature T is less than the temperature $T_{TH}$ and thus the glow plug 200 may be too cool. The glow plug controller 304 responds in the second scenario by causing the glow plug power source 302 to apply a voltage $V_H > V_N$ to the glow plug 200, in order to increase the glow plug temperature T. Therefore, if the voltage applied to the glow plug 200 increases, the temperature of the glow plug 200 will also increase. Similarly, if the voltage applied to the glow plug 200 decreases, the temperature of the glow plug 200 will also decrease due to the cooling effect of the mixture of gas and air in the combustor 16. If the glow plug current I(GPL) is equal to the glow plug current threshold $I_{TH}$(GPL), this is an indication that the glow plug 200 is performing as desired, and the applied voltage V(GPL) is maintained by the glow plug power source 302.

Figure 3B:
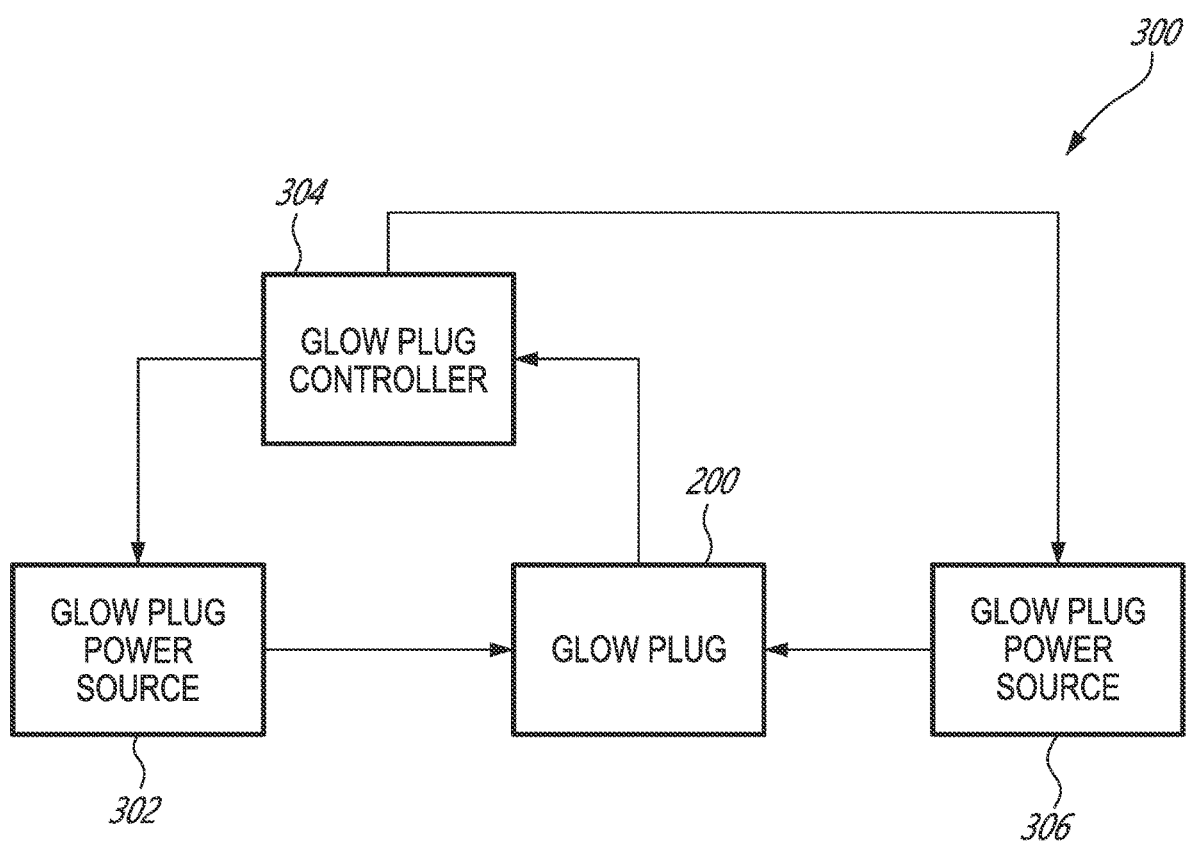

In some embodiments, and as illustrated in FIG. 3B, the glow plug power source 302 is operable only at one voltage, for example $V_N$ and another power source 306 is operable at the other voltage, for example $V_H$. In this case, the voltages V(GPL) applied to the glow plug 200 may be at constant levels, such that the glow plug power source 302 may be an on/off type power source that toggles between $V_N$ and substantially zero volts, and the glow plug power source 306 may be an on/off type power source that toggles between $V_H$ and substantially zero volts. In some embodiments, the glow plug power source 302 remains on even when the glow plug power source 306 is turned on, such that toggling the glow plug power source 306 on/off causes the glow plug voltage V(GPL) to toggle between $V_H$ and $V_N$.

In some embodiments, applying the higher voltage $V_H$ to increase the glow plug temperature T comprises switching or toggling between the voltage $V_H$ and the voltage $V_N$ in order to ensure that the current observed at the applied voltage V(GPL) can be periodically compared to the glow plug current threshold $I_{TH}$(GPL), such that the glow plug temperature T increases in a controlled manner and remains under control. Toggling may be done pseudo-randomly or at a given rate with a fixed pulse duration until the monitored glow plug current I(GPL) measured at the applied voltage V(GPL) approaches the glow plug current threshold $I_{TH}$(GPL). Using the embodiment of FIG. 3A, toggling between $V_H$ and $V_N$ comprises instructing the glow plug power source 302 to alternatively apply $V_H$ and $V_N$. Using the embodiment of FIG. 3B, toggling between $V_H$ and $V_N$ comprises turning the glow plug power source 306 on/off repeatedly while maintaining the glow plug power source 302 on. Other embodiments may also apply.

Toggling between the voltages $V_H$ and $V_N$ causes the glow plug temperature T to oscillate (go above, and fall below) about the desired temperature $T_{TH}$ that corresponds to the glow plug current threshold $I_{TH}$(GPL). For example, applying the voltage $V_H$ to the glow plug 200 in order to increase the glow plug temperature T may cause the resistance of the glow plug 200 to increase, and thus cause the glow plug current I(GPL) to fall below the glow plug current threshold $I_{TH}$(GPL). Subsequently toggling to apply the voltage $V_N$ to the glow plug 200 in order to decrease the glow plug temperature T may cause the resistance of the glow plug 200 to decrease, and thus cause the glow plug current I(GPL) to rise above the glow plug current threshold $I_{TH}$(GPL). It will be appreciated that the specific values for the voltages $V_H$ and $V_N$ may vary as a function of the type of glow plug 200 being used and the environment of the combustor 16 in which it will operate, among other possible factors.

The glow plug current threshold $I_{TH}$(GPL) is associated with one of the voltages $V_H$ and $V_N$, and the glow plug current I(GPL) is monitored or measured at the voltage $V_H$ or $V_N$ that is associated with the glow plug current threshold $I_{TH}$(GPL). In such a configuration, the glow plug controller 304 which monitors the glow plug current I(GPL) and makes a control decision based on the glow plug current I(GPL) only needs to sample the glow plug current I(GPL) at a single voltage $V_H$ or $V_N$. The glow plug controller 304 is thus able to use a single glow plug temperature threshold $T_{TH}$ determined at a single applied voltage $V_H$ or $V_N$ so as to alternate the glow plug 200 between the two voltages $V_H$ and $V_N$ in order to control the glow plug temperature T. The glow plug controller 304 is thus able to compare the glow plug current I(GPL) to a single, or only one, glow plug current threshold $I_{TH}$(GPL), about which the glow plug current I(GPL) oscillates (goes above and below). The glow plug controller 304 thus defines or operates in a circuit that is less complex (fewer switches, for example) because it avoids the need to sample the glow plug current I(GPL) at multiple applied voltages, and thus reduces the toggling between voltages, which may introduce electrical noise. The glow plug controller 304 may thus define or operate in a circuit that has or requires only one current sensing device.

With continued reference to FIGS. 3A and 3B, the glow plug controller 304 may be configured to monitor or measure a time parameter during which the voltages $V_H$ and $V_N$ are applied to the glow plug 200 by the glow plug power source(s) 302,306. The time parameter may be a period of time. The time parameter may be a duty cycle, which is determined as a ratio of the period of time spent at the voltage over a monitoring period of time (e.g. a 50% duty cycle corresponds to 0.1 s spent at the voltage over a monitoring period of 0.2 s).

The glow plug controller 304 may be configured to monitor or measure the time parameter during which the voltages $V_H$ and $V_N$ are applied to the glow plug 200 by the glow plug power source(s) 302,306 in the following possible manner. The glow plug controller 304 may be configured to monitor or measure the time parameter (time period or duty cycle) that the glow plug power source(s) 302,306 spend applying the voltages $V_H$ and $V_N$, such as by measuring the time that the glow plug power source(s) 302,306 spend at a switch position, and ignoring any time that the glow plug power source(s) 302,306 briefly pulse to the voltages $V_H$ and $V_N$ to measure the current I(GPL).

The glow plug controller 304 may be configured to monitor or measure the time parameter during which the voltages $V_H$ and $V_N$ are applied to the glow plug 200 by the glow plug power source(s) 302,306 in the additional following possible manner. The glow plug controller 304 may be configured to monitor the glow plug current I(GPL), and in particular, to monitor or measure the time parameter that the glow plug current I(GPL) is both above the glow plug current threshold $I_{TH}$(GPL) (which may indicate that the glow plug 200 is too cool) and below the glow plug current threshold $I_{TH}$(GPL) (which may indicate that the glow plug 200 is too hot). The glow plug controller 304 may be provided with or define a time parameter threshold. The time parameter threshold may be a maximum or upper limit of a period of time or a duty cycle. The time parameter threshold is indicative of the glow plug current I(GPL) being either above or below the glow plug current threshold $I_{TH}$(GPL) for longer than desired. For example, if the glow plug controller 304 measures that the time parameter that the glow plug current I(GPL) is above the glow plug current threshold $I_{TH}$(GPL) is greater than the time parameter threshold, then the value of one of the applied voltages $V_H$ and $V_N$ may need to be adjusted in order to increase the temperature of the glow plug 200. Similarly, if the glow plug controller 304 measures that the time parameter that the glow plug current I(GPL) is below the glow plug current threshold $I_{TH}$(GPL) is greater than the time parameter threshold, then the value of one of the applied voltages $V_H$ and $V_N$ may need to be adjusted in order to decrease the temperature of the glow plug 200.

The glow plug controller 304 may be configured to adjust the value of one of the applied voltages $V_H$ or $V_N$. The glow plug controller 304 may increase or decrease the value of one of the voltages $V_H$ or $V_N$ applied to the glow plug 200 by the glow plug power source(s) 302,306. In some embodiments, the voltage $V_H$ or $V_N$ whose value is adjusted is not the voltage $V_H$ or $V_N$ that is associated with the glow plug current threshold $I_{TH}$(GPL) and at which the glow plug current I(GPL) is sampled. For example, if the glow plug current I(GPL) is associated with the voltage $V_H$, then the voltage $V_N$ will be adjusted if the glow plug controller 304 measures that the time parameter that the glow plug current I(GPL) is above or below the glow plug current threshold $I_{TH}$(GPL) is greater than the time parameter threshold, or if the glow plug controller 304 determines that the duty cycle that the glow plug power source 306 spends applying the voltage $V_H$ exceeds a duty cycle threshold. Similarly, if the glow plug current I(GPL) is associated with the voltage $V_N$, then the voltage $V_H$ will be adjusted if the glow plug controller 304 measures that the time parameter that the glow plug current I(GPL) is above or below the glow plug current threshold $I_{TH}$(GPL) is greater than the time parameter threshold, or if the glow plug controller 304 determines that the duty cycle that the glow plug power source 302 spends applying the voltage $V_N$ exceeds a duty cycle threshold. In an embodiment, the glow plug power source(s) 302,306 providing one of the voltages $V_H$ or $V_N$ may be fixed to stay associated with the glow plug current threshold $I_{TH}$(GPL), while the glow plug power source(s) 302,306 providing the other of the voltages $V_H$ or $V_N$ is a variable voltage source. By monitoring the glow plug current I(GPL) and by measuring the time parameter spent at each voltage $V_H$ and $V_N$, the glow plug controller 304 is able adjust the value of the voltage $V_H$ or $V_N$ applied to the glow plug 200. This may allow the glow plug controller 304 to reduce the difference between the voltages $V_H$ and $V_N$. By reducing the difference between the voltages $V_H$ and $V_N$ applied to the glow plug 200 over time, the glow plug controller 304 helps the voltages $V_H$ and $V_N$ to converge on a time-averaged voltage value that can still adapt to changes in conditions within the combustor 16, e.g. such as when fuel is injected and cools the system, when increased air flow cools the system, or when ignition is successful and combustion begins to occur. By reducing the difference between the voltages $V_H$ and $V_N$ applied to the glow plug 200 over time, the glow plug controller 304 contributes to helping reduce thermal stresses which may affect the glow plug 200, and may also help to reduce induced electromagnetic noise. The glow plug system 300 is thus able to function with only one current threshold, and to use a timing criteria to toggle between a higher voltage ($V_H$) and a lower voltage ($V_N$).

The glow plug controller 304 may perform many cycles or iterations of monitoring the time parameter spent at each voltage $V_H$ and $V_N$ and adjusting the voltages $V_H$ and $V_N$ accordingly. The glow plug controller 304 may adjust the voltages $V_H$ and $V_N$ until the glow plug controller 304 determines that a time parameter at which the glow plug current I(GPL) is above the glow plug current threshold $I_{TH}$(GPL) is approximately equal to a time parameter at which the glow plug current I(GPL) is below the glow plug current threshold $I_{TH}$(GPL), for example. The glow plug controller 304 may thus adjust one of voltages $V_H$ or $V_N$ in this iterative manner until the glow plug 200 is operating approximately 50% of the time at the voltage $V_H$ and approximately 50% of the time at the voltage $V_N$, and thus has a duty cycle of 50% at each voltage $V_H$,$V_N$. Once the glow plug 200 has achieved this state of operation, the glow plug power source(s) 302,306 may still toggle between the voltages $V_H$ or $V_N$. In an embodiment, the voltages $V_H$ or $V_N$ are set to values which are expected to provide this 50-50 operation of the glow plug 200, and minor adjustments are made subsequently by the glow plug controller 304 as explained above. In an embodiment, the difference between values for the voltages $V_H$ or $V_N$ is initially established to be large, and is subsequently narrowed over time to a time-average voltage value by the glow plug controller 304 as explained above. The glow plug system 300 thus allows the glow plug current I(GPL) to oscillate about, and be compared to, a single glow plug current threshold $I_{TH}$(GPL), with an optimal scenario being that the glow plug current I(GPL) is above the glow plug current threshold $I_{TH}$(GPL) about 50% of the time and below the glow plug current threshold $I_{TH}$(GPL) about 50% of the time, while still being able to rapidly adjust $V_H$ or $V_N$ if necessary due to changing external effects such as external cooling or heating. The glow plug system 300 thus allows the glow plug current I(GPL) to oscillate about, and be compared to, a single glow plug current threshold $I_{TH}$(GPL), with an optimal scenario being that the glow plug voltage V(GPL) is $V_N$ about 50% of the time and is $V_H$ about 50% of the time, while still being able to rapidly adjust $V_H$ or $V_N$ if necessary due to changing external effects such as external cooling or heating.

Although the glow plug controller 304 is described as monitoring or measuring a time parameter during which the voltages $V_H$ and $V_N$ are applied to the glow plug 200 by the glow plug power source(s) 302,306, it will be appreciated that the glow plug controller 304 may alternatively count a number of cycles (e.g. fixed time period cycles) or instances that the voltages $V_H$ and $V_N$ are applied to the glow plug 200, and set a corresponding cycle number difference threshold or instance difference threshold. Thus, the glow plug controller 304 may function to count the number of cycles or instances of the applied voltages $V_H$ and/or $V_N$, compare the number to a cycle number difference threshold or instance difference threshold, and then command the glow plug power source(s) 302,304 to adjust the value of one of the voltages $V_H$ and $V_N$. Therefore, the measurement or monitoring of a time parameter by the glow plug controller 304 and the subsequent control decisions described above apply mutatis mutandis to an embodiment where the glow plug controller 304 counts and compares the number of cycles or instances that the voltages $V_H$ and $V_N$ are applied to the glow plug 200.

Figure 4A:
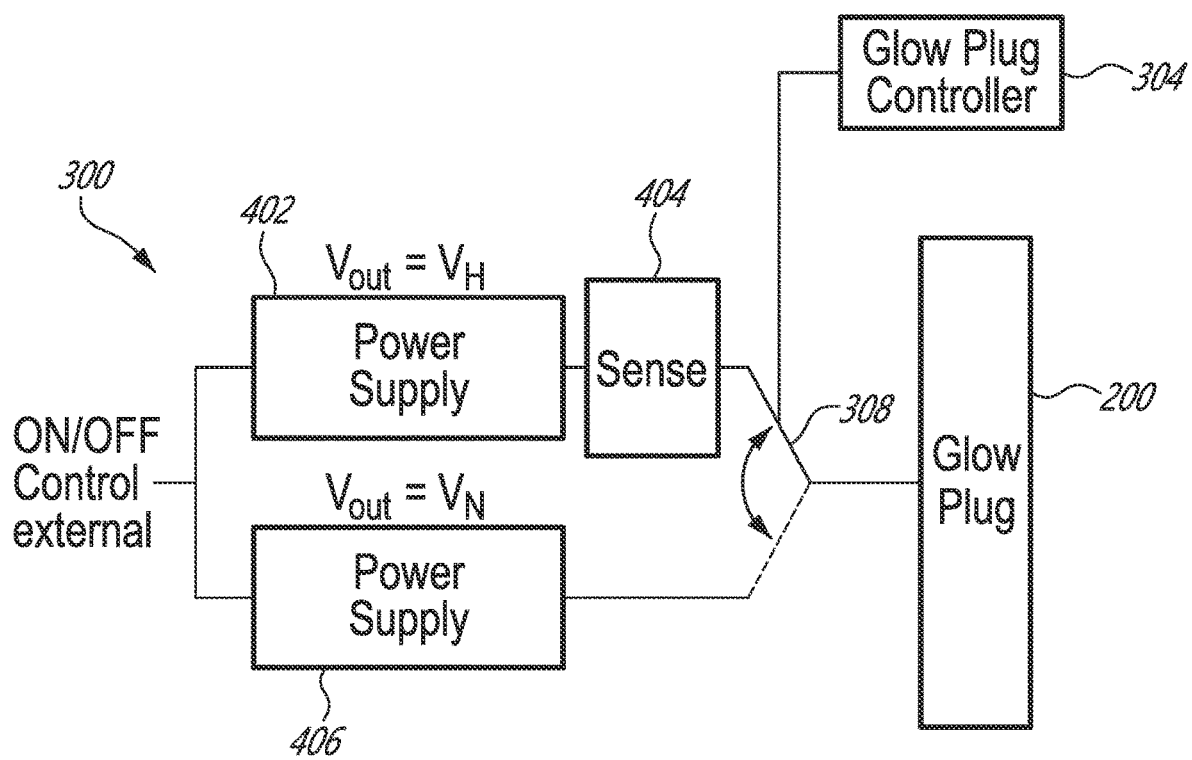
FIG. 4A is a diagram of an example implementation of a glow plug system.

Referring to FIG. 4A, there is illustrated a specific and non-limiting example for implementation of the glow plug system 300. The glow plug 200 is operatively coupled to two glow plug power supplies 402,406. An on/off external control turns the power supplies 402,406 on and off. The power supply 402 supplies an output voltage to the glow plug 200 that is $V_H$ and the power supply 406 supplies an output voltage to the glow plug that is $V_N$. A switch 308 of the glow plug system 300 can be toggled between the power supplies 402,406 in order to supply only one of the voltages $V_H$ and $V_N$ to the glow plug 200. The switch 308 may be controlled by the glow plug controller 304.

A current sensor 404 monitors the glow plug current I(GPL) flowing into the glow plug 400. In an example embodiment, the current sensor 404 is a resistor, but any device that detects electric current in a wire and generates a signal proportional to that current may be used. The generated signal may be analog or digital. In the specific and non-limiting example of the glow plug system 300 shown in FIG. 4A, the glow plug current I(GPL) is monitored at the voltage $V_H$ from the power supply 402, and the glow plug current threshold $I_{TH}$(GPL) is associated with the voltage $V_H$. The current sensor 404 in FIG. 4A is therefore associated with the power supply 402, and monitors the glow plug current I(GPL) at the applied voltage $V_H$. The glow plug current threshold $I_{TH}$(GPL) is set to a value that corresponds to the glow plug current I(GPL) that results from applying the voltage $V_H$ to the glow plug 200 at a desired operating temperature of the glow plug, such as $T_{TH}$. In one non-limiting example of such a scenario, the applied voltage $V_H$ is 12 V, the resistance of the glow plug 200 is 2 Ohms and the desired temperature $T_{TH}$ is 1150° C. Using the equation above for determining the glow plug current threshold $I_{TH}$(GPL), the value for the glow plug current threshold $I_{TH}$(GPL) is 6 A.

If, when the voltage $V_H$ is applied, the sensed glow plug current I(GPL) flowing into the glow plug 200 is greater than the glow plug current threshold $I_{TH}$(GPL), switch 308 is toggled to or maintained at the power supply 402 so that the voltage $V_H$ is applied to the glow plug 200. The sensed glow plug current I(GPL) in this condition is indicative of a low resistance and thus of a low glow plug temperature T, hence the need to apply voltage $V_H$ to increase the glow plug temperature T. If, when the voltage $V_H$ is applied, the sensed glow plug current I(GPL) flowing into the glow plug 200 is approximately equal to the glow plug current threshold $I_{TH}$(GPL), the switch 308 is toggled or maintained at the power supply 402 so that the voltage $V_H$ can be applied or maintained. The sensed glow plug current I(GPL) in this condition is indicative of the glow plug 200 operating at the desired threshold temperature $T_{TH}$. If, when the voltage $V_H$ is applied, the sensed glow plug current I(GPL) flowing into the glow plug 200 is less than the glow plug current threshold $I_{TH}$(GPL), switch 308 is toggled to the power supply 406 so that the voltage $V_N$ is applied to the glow plug 200. The sensed glow plug current I(GPL) in this condition is indicative of a higher resistance and thus of a higher glow plug temperature T, hence the need to apply voltage $V_N$ to decrease the glow plug temperature T. In an embodiment of the glow plug system 300 of FIG. 4A, the switch 308 may be toggled to the power supply 406 as soon as the sensed glow plug current I(GPL) falls below the glow plug current threshold $I_{TH}$(GPL). A tolerance may be added to the glow plug current threshold $I_{TH}$(GPL) such that toggling to the power supply 406 occurs after the sensed glow plug current I(GPL) falls below a current value corresponding to the glow plug current threshold $I_{TH}$(GPL) minus the tolerance. The addition of a tolerance may allow for reduced toggling and reduced EMI.

After the voltage $V_N$ is applied to the glow plug 200, the glow plug controller 304 may be commanded to wait an interval of time, such as the duration of an application of a pulse of the voltage $V_H$. This may provide time for the glow plug 200 to react to the effect of applying the lower, or "cool-down" voltage $V_N$. After the interval of time has passed, the switch 308 may be toggled to the power supply 402 to apply the voltage $V_H$ to the glow plug 200 so that the glow plug current I(GPL) can be sampled at the voltage $V_H$. If, at the applied voltage $V_H$, the sensed glow plug current I(GPL) flowing into the glow plug 200 is greater than the glow plug current threshold $I_{TH}$(GPL), switch 308 is toggled to, or maintained at, the power supply 402 so that the voltage $V_H$ is applied to the glow plug 200. Otherwise, the switch 308 is toggled to the power supply 406 so that the voltage $V_N$ can be maintained to further cool the glow plug 200. The duration of the interval may be determined through testing, and may vary depending on how quickly the glow plug 200 cools down in the combustor 16. For example, if the glow plug 200 cools down quickly, the interval will be relatively small because it may be desirable to quickly sample the glow plug current I(GPL) at the applied voltage $V_H$. Alternatively, a longer interval may be permissible if the glow plug 200 takes longer to cool down in the combustor 16.

This sequence of monitoring the glow plug current I(GPL) at the applied voltage $V_H$ and toggling the switch 308 between the voltages $V_H$ and $V_N$ may be performed repeatedly, in multiple cycles, until the desired glow plug temperature T is reached. However, it may occur that the desired glow plug temperature T is not reached, meaning that the glow plug temperature T might be too hot or too cold, because one or both of the voltages $V_H$ and $V_N$ are not set at values which effect the desired change in glow plug temperature T. In such a situation, it may be beneficial to adjust the values of one or both of the voltages $V_H$ or $V_N$, for example to be closer to that of the other voltage $V_H$ or $V_N$, using the iterative process described above. This would allow the difference between the values for the voltages $V_H$ or $V_N$ to decrease over time toward a time-average value that may reduce thermal stresses on the glow plug 200 and induced EM noise.

In the specific and non-limiting example of the glow plug system 300 shown in FIG. 4A, the glow plug current I(GPL) is monitored at the voltage $V_H$ and the glow plug current threshold $I_{TH}$(GPL) is associated with the voltage $V_H$. Therefore, in some embodiments, reducing the difference between the voltage $V_H$ and the voltage $V_N$ involves adjusting only the value of the voltage $V_N$. For example, when the measured time parameter that the voltage $V_H$ is applied is greater than the time parameter threshold, the value for the voltage $V_N$ may be increased. Stated differently, if too much time is being spent applying the voltage $V_H$ (i.e. the glow plug current I(GPL) is greater than the glow plug current threshold $I_{TH}$(GPL) for more than 50% of the time) but the glow plug temperature T is not increasing, it may be an indication that the glow plug 200 is cooling down too much when the switch 308 toggles to the voltage $V_N$, and thus that the value for the voltage $V_N$ is too low. Increasing the value for the voltage $V_N$ to a value closer to, but less than, that of the voltage $V_H$ may prevent the glow plug temperature T from dropping excessively when the voltage $V_N$ is applied, such that the application of the voltage $V_H$ will allow the glow plug temperature T to achieve the desired value.

It may also be possible to adjust the value of one or both of the voltages $V_H$ or $V_N$ in a manner that does not narrow the difference between them. For example, when the measured time parameter that the voltage $V_N$ is applied is greater than the time parameter threshold, the value for the voltage $V_N$ may be decreased, such that the difference between the voltages $V_H$ and $V_N$ is increased. Stated differently, if too much time is being spent applying the voltage $V_N$ (i.e. the glow plug current I(GPL) is less than the glow plug current threshold $I_{TH}$(GPL) for more than 50% of the time) but the glow plug temperature T is not decreasing, it may be an indication that the glow plug 200 is not cooling down sufficiently when the voltage $V_N$ is applied to the glow plug 200, and thus that the value for the voltage $V_N$ is too high. Decreasing the value for the voltage $V_N$ may allow the glow plug temperature T to drop sufficiently when the voltage $V_N$ is applied.

It may also be possible to adjust the value of one of the voltages, such as $V_N$, in a manner that narrows the difference between the voltages $V_N$ and $V_H$, by applying two operational parameters. The first operational parameter is one based on a duty cycle. An example of this first operational parameter is now described. If $V_H$ is applied over the past 0.2 s for a duration longer than 0.1 s (i.e. a duty cycle that exceeds 50%), this may be an indication that the value for $V_H$ is not sufficiently high to raise the glow plug temperature T to the desired value. In such a situation, the value for $V_N$ can be increased by an incremental voltage value $V_{CHANGE}$ to prevent the glow plug temperature T from dropping to low when $V_N$ is applied. Similarly, if over the past 0.2 s $V_H$ is applied for less than 0.1 s (i.e. a duty cycle that is less than 50%), this may be an indication that the value for $V_H$ is too high and causing the glow plug temperature T to increase too rapidly. In such a situation, the value for $V_N$ can be decreased by $V_{CHANGE}$, to allow the glow plug 200 to cool more rapidly when $V_N$ is applied. In both situations, the value for $V_H$ is kept constant such that the glow plug current I(GPL) can still be monitored at the single glow plug current threshold $I_{TH}$(GPL), in the configuration where the glow plug current threshold $I_{TH}$(GPL) is associated with the voltage $V_H$. If over the past 0.2 s $V_N$ is applied for more than 0.1 s (i.e. a duty cycle that exceeds 50%), this may be an indication that the value for $V_N$ is too high for reducing the glow plug temperature T to the desired value. In such a situation, the value for $V_N$ can be decreased by $V_{CHANGE}$. If over the past 0.2 s $V_N$ is applied for less than 0.1 s (i.e. a duty cycle that is less than 50%), this may be an indication that the value for $V_N$ is too low and is reducing the glow plug temperature T too quickly. In such a situation, the value for $V_N$ can be increased by $V_{CHANGE}$.

The second operational parameter is one based on narrowing the differences between the voltages $V_H$ and $V_N$. The second operational parameter runs or operates in addition to the first operational parameter based on duty cycles, and an example of this second operational parameter is now described. Every 0.5 s, the value for $V_N$ is increased by $V_{CHANGE}$, such that the voltages $V_H$ and $V_N$ converge toward each other. The duration of 0.5 s of the second operational parameter is an example that is chosen to be longer than the duration of 0.2 s of the first operational parameter, so that the first operational parameter is more powerful than the second operational parameter because it is monitoring the voltages more frequently. This allows the first operational parameter to override the second operational parameter. The change in the value for $V_N$ does not affect the value of the glow plug current threshold $I_{TH}$(GPL), in the configuration where the glow plug current threshold $I_{TH}$(GPL) is associated with the voltage $V_H$.

It may also be possible to adjust the value of both of the voltages $V_H$ or $V_N$ in a manner that narrows the difference between them applying the two operational parameters described above. An example of this first operational parameter is now described. If $V_H$ is applied over the past 0.2 s for a duration longer than 0.1 s (i.e. a duty cycle that exceeds 50%), this may be an indication that the value for $V_H$ is not sufficiently high to raise the glow plug temperature T to the desired value. In such a situation, the value for $V_H$ can be increased by $V_{CHANGE}$. Similarly, if over the past 0.2 s $V_H$ is applied for less than 0.1 s (i.e. a duty cycle that is less than 50%), this may be an indication that the value for $V_H$ is too high and causing the glow plug temperature T to increase too rapidly. In such a situation, the value for $V_H$ can be decreased by $V_{CHANGE}$. In both situations, the change in the value for $V_H$ will affect the value of the glow plug current threshold $I_{TH}$(GPL), in the configuration where the glow plug current threshold $I_{TH}$(GPL) is associated with the voltage $V_H$. If over the past 0.2 s $V_N$ is applied for more than 0.1 s (i.e. a duty cycle that exceeds 50%), this may be an indication that the value for $V_N$ is too high for reducing the glow plug temperature T to the desired value. In such a situation, the value for $V_N$ can be decreased by $V_{CHANGE}$. If over the past 0.2 s $V_N$ is applied for less than 0.1 s (i.e. a duty cycle that is less than 50%), this may be an indication that the value for $V_N$ is too low and is reducing the glow plug temperature T too quickly. In such a situation, the value for $V_N$ can be increased by $V_{CHANGE}$.

The second operational parameter is one based on narrowing the differences between the voltages $V_H$ and $V_N$. The second operational parameter runs or operates in addition to the first operational parameter based on duty cycles, and an example of this second operational parameter is now described. Every 0.5 s, the value for $V_H$ is decreased by $V_{CHANGE}$ and the value for $V_N$ is increased by $V_{CHANGE}$, such that the voltages $V_H$ and $V_N$ converge toward each other. The duration of 0.5 s of the second operational parameter is an example that is chosen to be longer than the duration of 0.2 s of the first operational parameter, so that the first operational parameter is more powerful than the second operational parameter because it is monitoring the voltages more frequently. This allows the first operational parameter to override the second operational parameter. The change in the value for $V_H$ or $V_N$ may affect the value of the glow plug current threshold $I_{TH}$(GPL), in the configuration where the glow plug current threshold $I_{TH}$(GPL) is associated with one of the voltages $V_H$ or $V_N$.

The first and second operational parameters are functions or logics that may be used to reduce the difference between $V_H$ and $V_N$. Since there may be situations where a 50% duty cycle is achieved even when the values for $V_H$ and $V_N$ are far apart (i.e. the time spent applying $V_H$ and $V_N$ is equal but the values are far enough apart that toggling between them may stress the glow plug 200), the additional logic provided by the second operational parameter helps to reduce the difference between $V_H$ and $V_N$, while the first operational parameter can override the decrease in $V_H$ and/or the increase in $V_N$ if necessary. Squeezing or pushing $V_H$ and $V_N$ by narrowing the difference between them may help to reduce the amount of EMI and lower stress on glow plug 200.

Figure 4B:
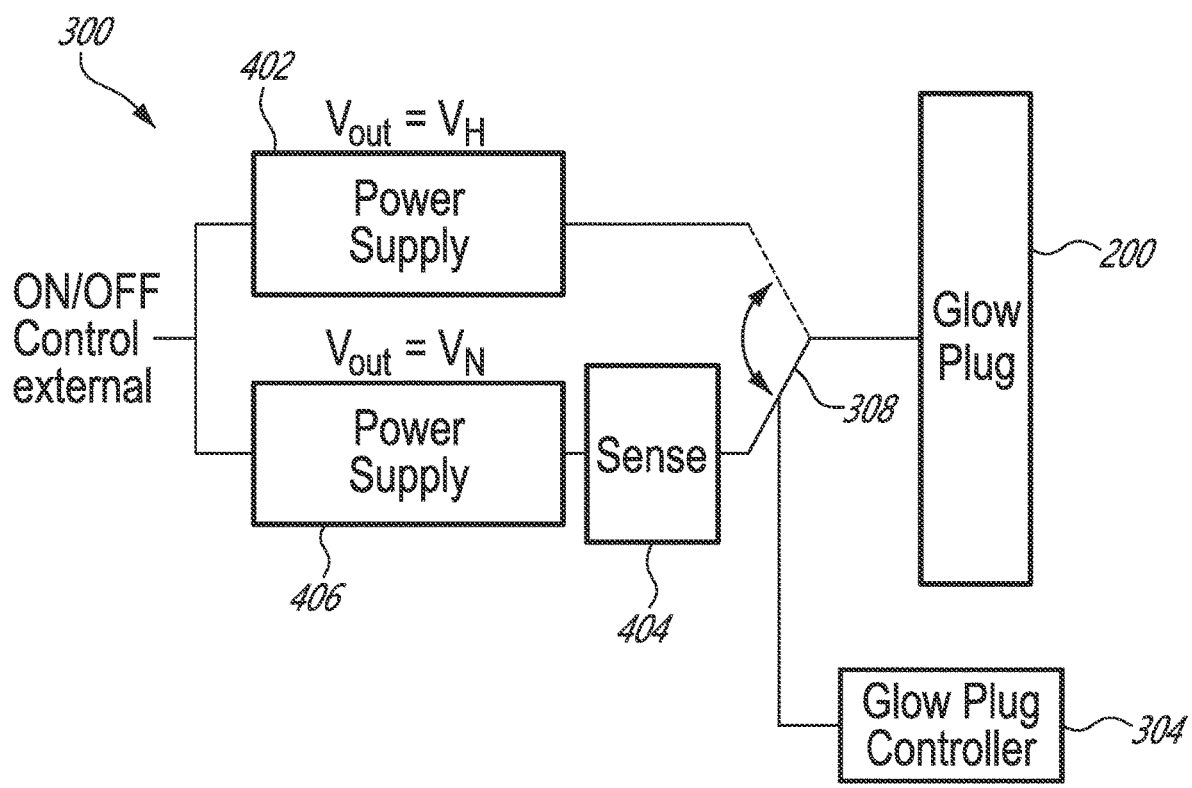
FIG. 4B is a diagram of an example implementation of a glow plug system.

In another specific and non-limiting example of the glow plug system 300 shown in FIG. 4B, the glow plug current I(GPL) is monitored at the voltage $V_N$ from the power supply 406, and the glow plug current threshold $I_{TH}$(GPL) is associated with the voltage $V_N$. The current sensor 404 in FIG. 4B is therefore associated with the power supply 406, and monitors the glow plug current I(GPL) at the applied voltage $V_N$. The glow plug current threshold $I_{TH}$(GPL) is set to a value that corresponds to the glow plug current I(GPL) that results from applying the voltage $V_N$ to the glow plug 200 at an operating temperature that is less than a minimum target temperature of the glow plug 200. In an embodiment, the voltage $V_N$ is set to be lower than the voltage needed to maintain a target temperature under all conditions. In one non-limiting example of such a scenario, the applied voltage $V_N$ is 2 V, the resistance of the glow plug 200 is 1 Ohm at the desired temperature $T_{TH}$ which is 1100° C. Using the equation above for determining the glow plug current threshold $I_{TH}$(GPL), the value for the glow plug current threshold $I_{TH}$(GPL) is 2 A.

If, when the voltage $V_N$ is applied, the sensed glow plug current I(GPL) flowing into the glow plug 200 is greater than the glow plug current threshold $I_{TH}$(GPL), switch 308 is toggled to the power supply 402 so that the voltage $V_H$ is applied to the glow plug 200. The sensed glow plug current I(GPL) in this condition is indicative of a low resistance and thus of a low glow plug temperature T, hence the need to apply voltage $V_H$ to increase the glow plug temperature T. If, when the voltage $V_N$ is applied, the sensed glow plug current I(GPL) flowing into the glow plug 200 is less than the glow plug current threshold $I_{TH}$(GPL), switch 308 is toggled to the power supply 406 so that the voltage $V_N$ is applied to the glow plug 200 or maintained. The sensed glow plug current I(GPL) in this condition is indicative of a higher resistance and thus of a higher glow plug temperature T, hence the need to apply the voltage $V_N$ to decrease the glow plug temperature T.

After the voltage $V_H$ is applied to the glow plug 200, the glow plug controller 304 may be commanded to wait an interval of time, such as the duration of an application of a pulse of the voltage $V_N$. This may provide time for the glow plug 200 to react to the effect of applying the higher voltage $V_H$. After the interval of time has passed, the switch 308 may be toggled to the power supply 406 to apply the voltage $V_N$ to the glow plug 200 for a brief moment so that the glow plug current I(GPL) can be sampled at the voltage $V_N$. If, at the applied voltage $V_N$, the sensed glow plug current I(GPL) flowing into the glow plug 200 is greater than the glow plug current threshold $I_{TH}$(GPL), the switch 308 is toggled to the power supply 402 so that the voltage $V_H$ is applied to the glow plug 200. Otherwise, the switch 308 is kept at the power supply 406 so that the voltage $V_N$ can be maintained to further cool the glow plug 200.

This sequence of monitoring the glow plug current I(GPL) at the applied voltage $V_N$ and toggling the switch 308 between the voltages $V_H$ and $V_N$ may be performed repeatedly, in multiple cycles, until the desired glow plug temperature T is reached. However, it may occur that the desired glow plug temperature T is not reached because one or both of the voltages $V_N$ and $V_H$ are not set at values which effect the desired change in glow plug temperature T, such that it may be beneficial to adjust the values of one of the voltages $V_H$ or $V_N$ using the iterative process described above. This may allow the difference between the values for the voltages $V_H$ or $V_N$ to decrease over time toward a time-average value that may reduce thermal stresses on the glow plug 200 and induced EM noise.

In the specific and non-limiting example of the glow plug system 300 shown in FIG. 4B, the glow plug current I(GPL) is monitored at the voltage $V_N$ and the glow plug current threshold $I_{TH}$(GPL) is associated with the voltage $V_N$. Therefore, reducing the difference between the voltage $V_H$ and the voltage $V_N$ may involve adjusting only the value of the voltage $V_H$. For example, when the time parameter that the voltage $V_N$ is applied is greater than the time parameter threshold, the value for the voltage $V_H$ may be reduced. Stated differently, if too much time is being spent applying the voltage $V_N$ (i.e. the glow plug current I(GPL) is less than the glow plug current threshold $I_{TH}$(GPL) for more than 50% of the time) but the glow plug temperature T is not decreasing, it may be an indication that the glow plug 200 is becoming too hot when the voltage $V_H$ is applied, and thus that the value for the voltage $V_H$ is too high. Decreasing the value for the voltage $V_H$ to a value closer to, but greater than, that of the voltage $V_N$ may allow the glow plug temperature T to drop sufficiently when the voltage $V_N$ is applied, such that the application of the voltage $V_N$ will allow the glow plug temperature T to achieve the desired value.

It may also be possible to adjust the value of one or both of the voltages $V_H$ or $V_N$ in a manner that does not narrow the difference between them. For example, in the example of the glow plug system 300 shown in FIG. 4B, when the time parameter that the voltage $V_H$ is applied is greater than the time parameter threshold, the value for the voltage $V_H$ may be increased thereby increasing the difference between the voltages $V_H$ and $V_N$. Stated differently, if too much time is being spent applying the voltage $V_H$ (i.e. the glow plug current I(GPL) is greater than the glow plug current threshold $I_{TH}$(GPL) for more than 50% of the time) but the glow plug temperature T is not increasing, it may be an indication that the glow plug 200 is not heating up sufficiently when the voltage $V_H$ is applied to the glow plug 200, and thus that the value for the voltage $V_H$ is too low. Increasing the value for the voltage $V_H$ may allow the power source 402 to apply a higher voltage $V_H$ so that the glow plug temperature T increases sufficiently when the voltage $V_H$ is applied.

It will be understood that the glow plug system 300 may be implemented in various ways and that the examples of FIGS. 4A and 4B illustrate some such ways. Additional embodiments may also apply, such as changing both $V_H$ and $V_N$ through an iterative process to obtain a better balance between the time spent at $V_H$ and the time spent at $V_N$. Changing a voltage associated with the glow plug current threshold $I_{TH}$(GPL) will involve changing the value of the glow plug current threshold $I_{TH}$(GPL) so as to match the new value of the associated voltage. That is to say, if the glow plug current threshold $I_{TH}$(GPL) is associated with $V_H$ and the value of $V_H$ changes, the value of $I_{TH}$(GPL) is adjusted accordingly. Similarly, if the glow plug current threshold $I_{TH}$(GPL) is associated with $V_N$ and the value of $V_N$ changes, the value of $I_{TH}$(GPL) is adjusted accordingly. In some embodiments, changes to the voltage levels may be predetermined, such that corresponding values of $I_{TH}$(GPL) are also predetermined and my be used concurrently. For example, changes may be applied in increments of 1 V, 1.5V, 2 V, etc, and the associated $I_{TH}$(GPL) for each new voltage level may be retrieved and used accordingly. Furthermore, the circuit can be designed such that the $I_{TH}$(GPL) reference is modified for example by the same switching process that selects the different voltage levels such that $I_{TH}$(GPL) and $V_N$ or $V_H$ change simultaneously.

Figure 5:
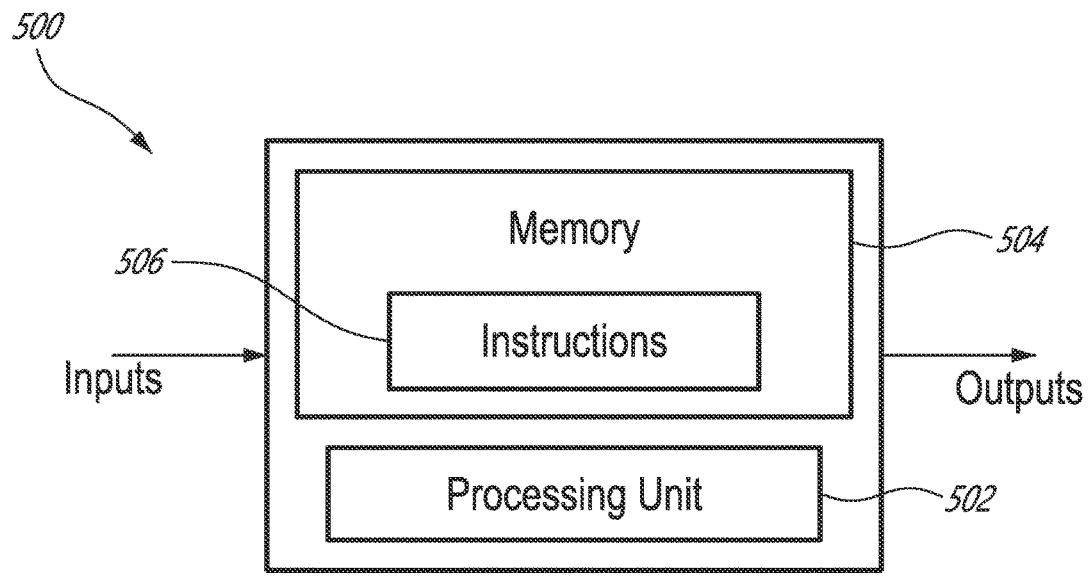
FIG. 5 is a block diagram of an example computing device.

In some embodiments, the glow plug controller 304 is implemented in one or more computing devices 500, as illustrated in FIG. 5. For simplicity only one computing device 500 is shown but the system may include more computing devices 500 operable to exchange data. The computing devices 500 may be the same or different types of devices. Note that the controller 304 can be implemented as part of a full-authority digital engine controls (FADEC) or other similar device, including electronic engine control (EEC), engine control unit (ECU), avionics or cockpit equipment, electronic propeller control, propeller control unit, and the like. In some embodiments, the controller 304 is implemented as part of the engine controller 102, in part or in whole. In this manner, operation of the glow plug may be managed by an engine control system. Other embodiments may also apply.

The computing device 500 comprises a processing unit 502 and a memory 504 which has stored therein computer-executable instructions 506. The processing unit 502 may comprise any suitable devices configured to implement a method such that instructions 506, when executed by the computing device 500 or other programmable apparatus, may cause the functions/acts/steps performed as part of a method 600 as described in FIG. 6 to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Figure 6:
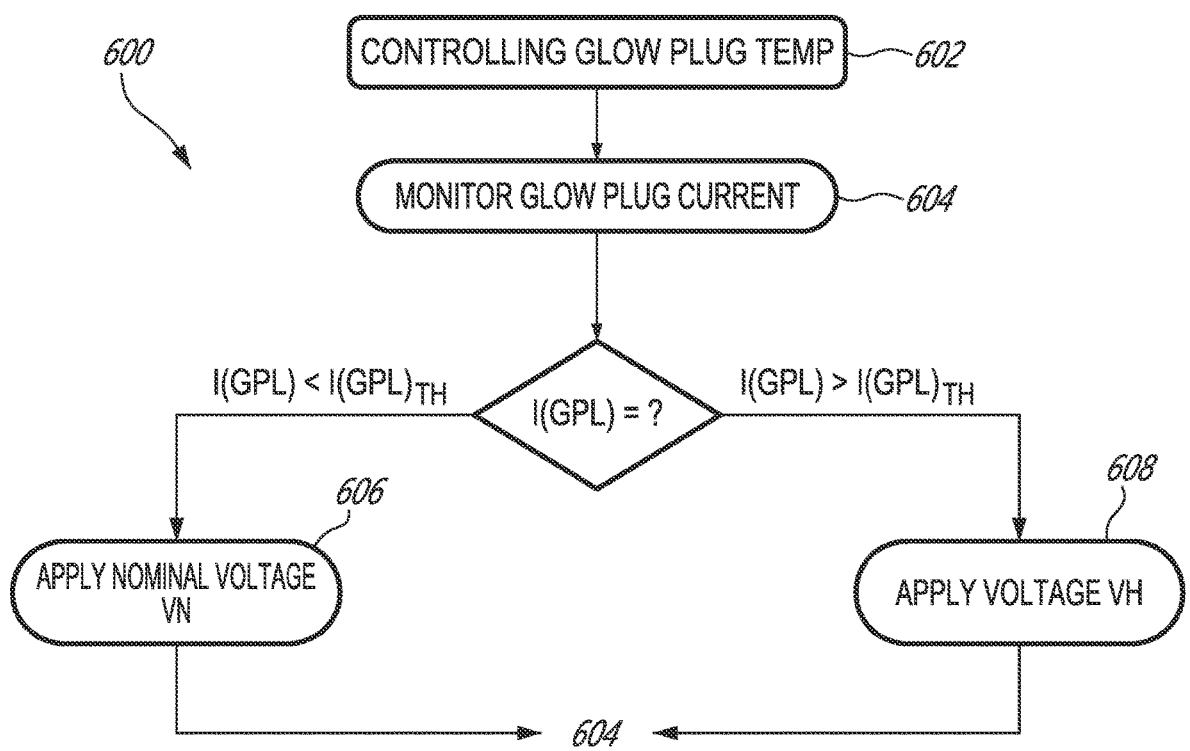
FIG. 6 is a flow chart of an example method for operating a glow plug.

Referring to FIG. 6, an example method 600 of operating a glow plug, such as the glow plug 200, is described. At step 602, the method includes controlling the glow plug temperature T by switching between applying the voltages $V_H$ and $V_N$ to the glow plug 200. Applying the voltages $V_H$ and $V_N$ causes the glow plug current I(GPL) to oscillate about the glow plug current threshold $I_{TH}$(GPL).

At step 604, the method includes monitoring the glow plug current I(GPL) at the applied voltage $V_H$ or $V_N$ that is associated with the glow plug current threshold $I_{TH}$(GPL). When the glow plug current I(GPL) at the applied voltage $V_H$ or $V_N$ is less than the glow plug current threshold $I_{TH}$(GPL), the nominal voltage $V_N$ is applied to the glow plug 200 at step 606 to lower the glow plug temperature T. When the glow plug current I(GPL) at the applied voltage $V_H$ or $V_N$ is greater than the glow plug current threshold $I_{TH}$(GPL), the voltage $V_H$>$V_N$ is applied to the glow plug 200 at step 608 to increase the glow plug temperature T. After each one of steps 606 and 608, the method 600 loops back to step 604 to continue monitoring the glow plug current I(GPL) at the applied voltage $V_H$ or $V_N$ and apply the proper voltage $V_H$ or $V_N$ in order to manage the temperature of the glow plug 200.

Although the method 600 refers to "applying a voltage" to the glow plug 200, it will be understood that this expression includes applying the voltage via one or more power source as well as causing one or more power source to apply the voltage. The expression also includes causing one or more switches, such as the one illustrated in FIGS. 4A and 4B, to switch or toggle in order to set the glow plug voltage V(GPL). The method 600 may be performed by the glow plug controller 304 using an embodiment as illustrated in FIGS. 3A to 4B, a combination thereof, or any equivalents thereof.

It will be understood by those skilled in the art that the method 600 allows the temperature of the glow plug to be managed without any independent temperature feedback and without complex micro-processors to measure glow plug voltage. The glow plug system 300 may thus have lower costs, lower weight, and be more reliable due to lower component count and higher power supply efficiency. As stated above, glow plug management may also be integrated into an engine controller 102 of an engine 100, for example via a solenoid driver interface. In some embodiments, an internal processor of the engine controller 102 may also be used to provide gradually varying glow plug voltages to the glow plug 200. The method 600 does not require any calculations, such as resistance calculations or others, to manage the glow plug temperature T. The method 600 does not require any feedback or input related to environmental and engine operating conditions to manage the glow plug temperature T. The method 600 does not rely on any data to be provided by the engine controller 102 or any other device to manage the glow plug temperature T.

Figure 7:
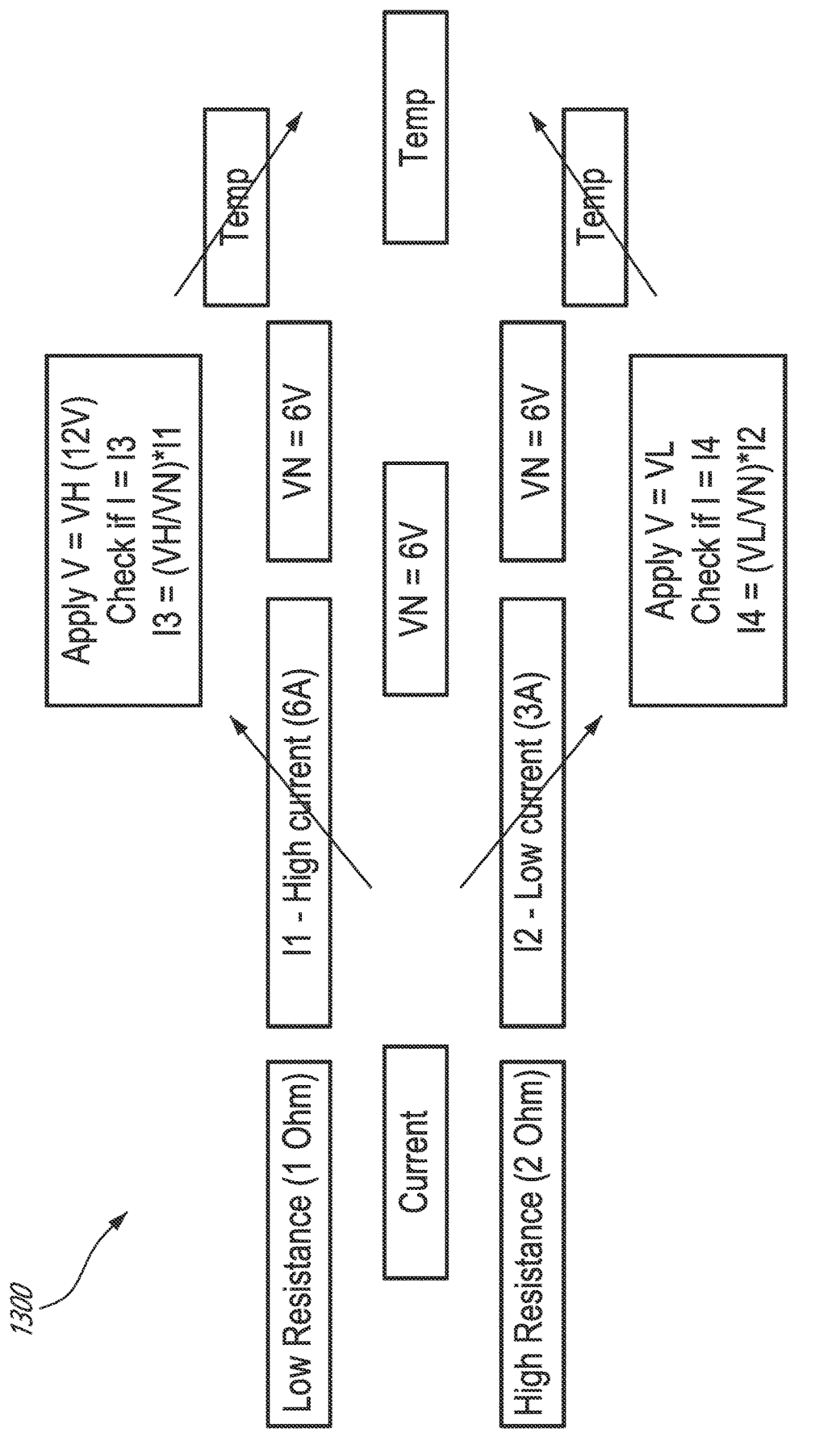
FIG. 7 is a schematic diagram of an example application of a method for operating a glow plug.

Another possible configuration of the glow plug system 1300 is shown in FIG. 7. The description of features and their associated functions and advantages provided above with respect to the glow plug system 300 applies mutatis mutandis to the glow plug system 1300 of FIG. 7. In the glow plug system 1300, a first current threshold I1 is defined at the lower temperature threshold T1 (e.g. 1100° C.). At the applied voltage $V_N$ (e.g. 6 V) and known resistance (e.g. 1 Ohm) at the lower temperature threshold T1, the first current threshold I1 can be determined to be, for example, 6 A. A second current threshold I2 is defined at the upper temperature threshold T2 (e.g. 1200° C.). At the applied voltage $V_N$ (e.g. 6 V) and known resistance (e.g. 2 Ohm) at the upper temperature threshold T2, the second current threshold I2 can be determined to be, for example, 3 A. It is desired to operate the glow plug system 1300 so that that glow plug temperature T is between the upper and lower temperature thresholds T1, T2. In the glow plug system 1300, the glow plug current I(GPL) is monitored at different applied voltages V(GPL). For example, the glow plug current I(GPL) may be monitored at the applied voltage $V_H$>$V_N$, and compared to a third current threshold I3. The third current threshold I3 is the result of multiplying the first current threshold I1 by the ratio of $V_H$/$V_N$. If the glow plug current I(GPL) at the applied voltage $V_H$ is equal to the third current threshold I3, then the voltage $V_H$ is applied to the glow plug 22 to increase the glow plug temperature T. In the glow plug system 1300, the glow plug current I(GPL) may also be monitored at a lower applied voltage $V_L$<$V_N$, and compared to a fourth current threshold I4. The fourth current threshold I4 is the result of multiplying the second current threshold I2 by the ratio of $V_L$/$V_N$. If the glow plug current I(GPL) at the applied voltage $V_L$ is equal to the fourth current threshold I4, then the voltage $V_L$ is applied to the glow plug 22 to lower the glow plug temperature T. In the glow plug system 1300, applying the non-zero voltage $V_L$ allows for sensing the glow plug current I(GPL) during the low power portion of the cycle. Having a current threshold defined for the higher voltage $V_H$ allows for continuous monitoring of the glow plug current I(GPL) without having to toggle to a different voltage for the purposes of testing the glow plug current I(GPL). The glow plug system 1300 may allow for continuous current checks, and may have lower EMI because it will toggle between voltage levels less frequently. The glow plug system 1300 may use only current sensor but multiple voltage levels ($V_H$, $V_N$, $V_L$) and associated current thresholds. In the glow plug system 1300, the voltage $V_N$ and its associated current threshold may be adjusted as needed until application of $V_H$ or $V_L$ is no longer necessary.

FIG. 8 plots separate curves for the temperature, current and voltage as a function of time for an example of the glow plug system 300 described herein. The curves shown in FIG. 8 are generated based on the specific and non-limiting example of the glow plug system 300 shown in FIG. 4A, where the glow plug current I(GPL) is monitored at the voltage $V_H$ from the power supply 402, and the glow plug current threshold $I_{TH}$(GPL) is associated with the voltage $V_H$. The glow plug current threshold $I_{TH}$(GPL) is set to a value that corresponds to the glow plug current I(GPL) that results from applying the voltage $V_H$ to the glow plug 200 at a desired operating temperature of the glow plug, such as $T_{TH}$.

Referring to FIG. 8, at time zero when the glow plug 200 is cool, the glow plug temperature T is low. The voltage $V_H$ is then applied at time T1 to heat the glow plug 200 to the desired operating temperature $T_{TH}$. At time T1, the glow plug current I(GPL) monitored at the applied voltage $V_H$ is greater than the glow plug current threshold $I_{TH}$(GPL). From the time T1 to time T2, the glow plug 200 gradually warms up such that the glow plug temperature T increases and the glow plug current I(GPL) at the applied voltage $V_H$ decreases accordingly. Once the monitored glow plug current I(GPL) is equal to or falls below the glow plug current threshold $I_{TH}$(GPL) at time T2, it is an indication that the glow plug temperature T has achieved or exceeded the desired operating temperature $T_{TH}$, such that the lower voltage $V_N$ is applied to ensure that the glow plug 200 does not overheat.

At time T2 and the application of the voltage $V_N$, the glow plug current I(GPL) drops to a value lower than the glow plug current threshold $I_{TH}$(GPL). From time T2 to time T3, the glow plug temperature T increases much less rapidly compared to the increase from time T1 to T2, such that the glow plug current I(GPL) at the applied voltage $V_N$ continues to decrease accordingly. From time T2 to time T3, the controller 304 monitors the glow plug current I(GPL) by waiting an interval of time and then applying spikes or short pulses P of the voltage $V_H$, which cause corresponding spikes in the glow plug current I(GPL). Between the time T2 and T3, all of these spikes in the glow plug current I(GPL) are less than the glow plug current threshold $I_{TH}$(GPL), which indicates that the glow plug 200 is still too warm and the voltage $V_N$ should continue to be applied to decrease the glow plug temperature T.

From time T3 to T4, the glow plug temperature T begins to lower toward the desired operating temperature $T_{TH}$, and the glow plug current I(GPL) at the applied voltage $V_N$ begins to increase accordingly. From time T3 to time T4, the controller 304 monitors the glow plug current I(GPL) by applying short pulses P of the voltage $V_H$, which cause corresponding spikes in the glow plug current I(GPL). Between the time T3 and T4, the first two of these spikes in the glow plug current I(GPL) are less than the glow plug current threshold $I_{TH}$(GPL), which indicates that the glow plug 200 is still too warm and the voltage $V_N$ should continue to be applied to decrease the glow plug temperature T. Between the time T3 and T4, the last of these spikes in the glow plug current I(GPL) is greater than the glow plug current threshold $I_{TH}$(GPL), which indicates that the glow plug 200 has dropped below the desired operating temperature $T_{TH}$ and the voltage $V_H$ should continue to be applied to increase the glow plug temperature T. This monitoring at a constant voltage, adjustment of the other voltage, and corresponding oscillation of the glow plug current I(GPL) above and below the glow plug current threshold $I_{TH}$(GPL) continues in order to ensure that the glow plug 200 is operating at the desired operating temperature $T_{TH}$. The values for one or more of the voltage $V_H$ and $V_N$ may be adjusted over time to help effect the desired change in glow plug temperature T, which may cause the glow plug current I(GPL) to more tightly track the glow plug current threshold $I_{TH}$(GPL).

The method 600 for operating a glow plug and glow plug system 300 described herein may be implemented in a high level procedural or object oriented programming or scripting language, or a combination thereof, to communicate with or assist in the operation of a computer system, for example the computing device 500. Alternatively, the method 600 and system 300 may be implemented in assembly or machine language. The language may be a compiled or interpreted language. Program code for implementing the method 600 and system 300 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the method 600 and system 300 may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 600.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the glow plug may be used outside of an engine, or have a design that differs from that illustrated in FIG. 2. In another example, a plurality of glow plugs may be managed by a glow plug controller concurrently. Yet further modifications could be implemented by a person of ordinary skill in the art in view of the present disclosure, which modifications would be within the scope of the present technology.

The invention claimed is:

1. A method for operating a glow plug, the method comprising:
   controlling a temperature of the glow plug by switching between applying a voltage $V_H$ and applying a voltage $V_N < V_H$ to the glow plug, the applying the voltage $V_H$ and the applying the voltage $V_N$ causing a glow plug current to oscillate about a glow plug current threshold, the glow plug current threshold associated with one of the voltage $V_H$ and the voltage $V_N$;
   when the glow plug current threshold is associated with the voltage $V_H$, monitoring the glow plug current at the voltage $V_H$;
   when the glow plug current threshold is associated with the voltage $V_N$ monitoring the glow plug current at the voltage $V_N$;
   applying the voltage $V_H$ when the glow plug current is greater than the glow plug current threshold;
   applying the voltage $V_N$ when the glow plug current is less than the glow plug current threshold;
   determining a time parameter that the glow plug current is above the glow plug current threshold; and
   determining a time parameter that the glow plug current is below the glow plug current threshold.

2. The method of claim 1, wherein measuring the time parameter includes defining a time parameter threshold, the method comprising adjusting one of the voltage $V_H$ and the voltage $V_N$ when the time parameter that the glow plug current is above or below the glow plug current threshold is longer than the time parameter threshold.

3. The method of claim 2, wherein adjusting one of the voltage $V_H$ and the voltage $V_N$ includes reducing a difference between the voltage $V_H$ and the voltage $V_N$ by modifying one of the voltage $V_H$ and the voltage $V_N$ that is not the one of the voltage $V_H$ and the voltage $V_N$ associated with the glow plug current threshold.

4. The method of claim 2, wherein adjusting one of the voltage $V_H$ and the voltage $V_N$ includes adjusting one of the voltage $V_H$ and the voltage $V_N$ until the time parameter that the glow plug current is above the glow plug current threshold is approximately equal to the time parameter that the glow plug current is below the glow plug current threshold.

5. The method of claim 1, wherein the glow plug current threshold is an only current threshold about which the glow plug current oscillates.

6. The method of claim 1, comprising:
   determining a time parameter that the voltage $V_H$ is applied, determining a time parameter that the voltage $V_N$ is applied, and defining a time parameter threshold;
   reducing a difference between the voltage $V_H$ and the voltage $V_N$ by increasing the voltage $V_N$ to a value less than the voltage $V_H$ when the time parameter that the voltage $V_H$ is applied is greater than the time parameter threshold; and
   decreasing the voltage $V_N$ when the time parameter that the voltage $V_N$ is applied is greater than the time parameter threshold.

7. The method of claim 1, wherein the glow plug current threshold is set to a value that corresponds to the glow plug current that results from applying the voltage $V_H$ to the glow plug at a desired operating temperature of the glow plug.

8. The method of claim 1, comprising:
   determining a time parameter that the voltage $V_H$ is applied, determining a time parameter that the voltage $V_N$ is applied, and defining a time parameter threshold;
   increasing the voltage $V_H$ when the time parameter that the voltage $V_H$ is applied is greater than the time parameter threshold; and
   reducing a difference between the voltage $V_H$ and the voltage $V_N$ by decreasing the voltage $V_H$ to a value greater than the voltage $V_N$ when the time parameter that the voltage $V_N$ is applied is greater than the time parameter threshold.

9. The method of claim 1, wherein the glow plug current threshold is set to a value that corresponds to the glow plug current that results from applying the voltage $V_N$ to the glow plug at an operating temperature that is less than a minimum target temperature of the glow plug.

10. The method of claim 1, wherein applying the applying the voltage $V_H$ and the voltage $V_N$ comprises switching between constant voltage levels.

11. The method of claim 1, wherein applying the voltage $V_H$ and the voltage $V_N$ comprises gradually varying an applied voltage to the glow plug.

12. A glow plug system, comprising:
   a glow plug having a body, a glowing end extending from the body, and a connecting end opposite to the glowing end;
   at least one glow plug power source operatively connected to the connecting end of the glow plug for applying a voltage thereto; and
   a glow plug controller coupled to the glow plug and the at least one glow plug power source and configured for:
      controlling a temperature of the glow plug by switching between applying with the at least one glow plug power source a voltage $V_H$ and applying a voltage $V_N < V_H$ to the glow plug, the applying the voltage $V_H$ and the applying the voltage $V_N$ causing a glow plug current to oscillate about a glow plug current threshold, the glow plug current threshold associated with one of the voltage $V_H$ and the voltage $V_N$;
      when the glow plug current threshold is associated with the voltage $V_H$, monitoring the glow plug current at the voltage $V_H$;
      when the glow plug current threshold is associated with the voltage $V_N$, monitoring the glow plug current at the voltage $V_N$;
      applying the voltage $V_H$ when the glow plug current is greater than the glow plug current threshold;
      applying the voltage $V_N$ when the glow plug current is less than the glow plug current threshold;

determining a time parameter that the glow plug current is above the glow plug current threshold; and
determining a time parameter that the glow plug current is below the glow plug current threshold.

13. The glow plug system of claim 12, wherein the glow plug controller is configured for defining a time parameter threshold, and for adjusting one of the voltage $V_H$ and the voltage $V_N$ when the time parameter that the glow plug current is above or below the glow plug current threshold is longer than the time parameter threshold.

14. The glow plug system of claim 12, wherein the glow plug controller is configured for adjusting one of the voltage $V_H$ and the voltage $V_N$ that is not the one of the voltage $V_H$ and the voltage $V_N$ associated with the glow plug current threshold.

15. The glow plug system of claim 13, wherein the glow plug controller is configured for adjusting one of the voltage $V_H$ and the voltage $V_N$ until the time parameter that the glow plug current is above the glow plug current threshold is approximately equal to the time parameter that the glow plug current is below the glow plug current threshold.

16. The glow plug system of claim 12, wherein the glow plug current threshold is an only current threshold about which the glow plug current oscillates.

17. A method for operating a glow plug, the method comprising:
controlling a temperature of the glow plug by switching between applying a voltage $V_H$ and applying a voltage $V_N<V_H$ to the glow plug, the applying the voltage $V_H$ and the applying the voltage $V_N$ causing a glow plug current to oscillate about a glow plug current threshold;
wherein:
the glow plug current threshold is associated with the voltage $V_H$;
the method comprises:
monitoring the glow plug current at the voltage $V_H$;
applying the voltage $V_H$ when the glow plug current is greater than the glow plug current threshold;
applying the voltage $V_N$ when the glow plug current is less than the glow plug current threshold;
determining a time parameter that the voltage $V_H$ is applied, determining a time parameter that the voltage $V_N$ is applied, and defining a time parameter threshold;
reducing a difference between the voltage $V_H$ and the voltage $V_N$ by increasing the voltage $V_N$ to a value less than the voltage $V_H$ when the time parameter that the voltage $V_H$ is applied is greater than the time parameter threshold; and
decreasing the voltage $V_N$ when the time parameter that the voltage $V_N$ is applied is greater than the time parameter threshold.

18. A method for operating a glow plug, the method comprising:
controlling a temperature of the glow plug by switching between applying a voltage $V_H$ and applying a voltage $V_N<V_H$ to the glow plug, the applying the voltage $V_H$ and the applying the voltage $V_N$ causing a glow plug current to oscillate about a glow plug current threshold;
wherein:
the glow plug current threshold is associated with the voltage $V_N$;
the method comprises:
monitoring the glow plug current at the voltage $V_N$;
applying the voltage $V_H$ when the glow plug current is greater than the glow plug current threshold;
applying the voltage $V_N$ when the glow plug current is less than the glow plug current threshold;
determining a time parameter that the voltage $V_H$ is applied, determining a time parameter that the voltage $V_N$ is applied, and defining a time parameter threshold;
increasing the voltage $V_H$ when the time parameter that the voltage $V_H$ is applied is greater than the time parameter threshold; and
reducing a difference between the voltage $V_H$ and the voltage $V_N$ by decreasing the voltage $V_H$ to a value greater than the voltage $V_N$ when the time parameter that the voltage $V_N$ is applied is greater than the time parameter threshold.

* * * * *